US009299057B2

(12) United States Patent  (10) Patent No.: US 9,299,057 B2
Benedek et al.  (45) Date of Patent: Mar. 29, 2016

(54) MESSAGE SEARCH METHOD AND ELECTRONIC DEVICE

(75) Inventors: Joseph Eytan Benedek, Thornhill (CA); Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 186 days.

(21) Appl. No.: 13/416,985

(22) Filed: Mar. 9, 2012

(65) Prior Publication Data

US 2013/0238651 A1  Sep. 12, 2013

(51) Int. Cl.
*G06F 17/30* (2006.01)
*G06F 3/0488* (2013.01)
*G06Q 10/10* (2012.01)

(52) U.S. Cl.
CPC .............. *G06Q 10/10* (2013.01); *G06F 3/0488* (2013.01); *G06F 17/30103* (2013.01); *G06F 17/30554* (2013.01)

(58) Field of Classification Search
CPC ................................................ G06F 17/30672
USPC ......................................... 707/729, 772, 765
See application file for complete search history.

(56) References Cited

U.S. PATENT DOCUMENTS

| | | | | |
|---|---|---|---|---|
| 6,983,310 | B2 * | 1/2006 | Rouse et al. .................. | 709/206 |
| 7,092,936 | B1 * | 8/2006 | Alonso et al. ................. | 707/737 |
| 8,549,603 | B2 * | 10/2013 | Buckley et al. .................... | 726/9 |
| 2004/0186848 | A1 * | 9/2004 | Kobashikawa et al. ....... | 707/102 |
| 2004/0268265 | A1 * | 12/2004 | Berger .......................... | 715/752 |
| 2007/0061308 | A1 * | 3/2007 | Hartwell et al. ................. | 707/3 |
| 2008/0208812 | A1 * | 8/2008 | Quoc et al. ........................ | 707/3 |
| 2009/0042602 | A1 | 2/2009 | Nagata et al. | |
| 2009/0055374 | A1 * | 2/2009 | Surazski et al. .................. | 707/5 |
| 2009/0193019 | A1 * | 7/2009 | Hassan et al. ...................... | 707/5 |
| 2009/0228825 | A1 * | 9/2009 | Van Os et al. .................. | 715/780 |
| 2010/0011317 | A1 | 1/2010 | Lee | |
| 2010/0048231 | A1 * | 2/2010 | Donald et al. ................ | 455/466 |
| 2010/0125599 | A1 * | 5/2010 | Cheng et al. ................... | 707/771 |
| 2010/0161594 | A1 * | 6/2010 | Prasad et al. .................. | 707/722 |
| 2010/0274815 | A1 * | 10/2010 | Vanasco ......................... | 707/798 |
| 2010/0312782 | A1 * | 12/2010 | Li et al. .......................... | 707/769 |
| 2011/0130123 | A1 | 6/2011 | Myaeng et al. | |
| 2011/0252023 | A1 * | 10/2011 | Santamaria et al. .......... | 707/723 |
| 2012/0197857 | A1 * | 8/2012 | Huang et al. ................... | 707/706 |
| 2013/0084902 | A1 * | 4/2013 | de Ruiter ....................... | 455/466 |

FOREIGN PATENT DOCUMENTS

EP  2073517  6/2009
EP  2144411  1/2010

OTHER PUBLICATIONS

European Patent Office, "Extended European Search Report," issued in connection with corresponding application No. EP 12158879.2, on Aug. 13, 2012, 7 pages.

* cited by examiner

*Primary Examiner* — James E Richardson
(74) *Attorney, Agent, or Firm* — Jon Gibbons; Fleit Gibbons Gutman Bongini & Bianco P.L.

(57) ABSTRACT

An example method includes displaying information associated with a first message of a first type on a display of an electronic device, detecting initiation of a search associated with the first message, identifying, by the electronic device, a search request determined from an element of the first message, searching, by the electronic device, for a second message of the first type and a third message of a second type, wherein the second message and the third message correspond to the search request, and displaying information associated with the second message and information associated with the third message.

26 Claims, 3 Drawing Sheets

MESSAGE SEARCH METHOD AND ELECTRONIC DEVICE

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
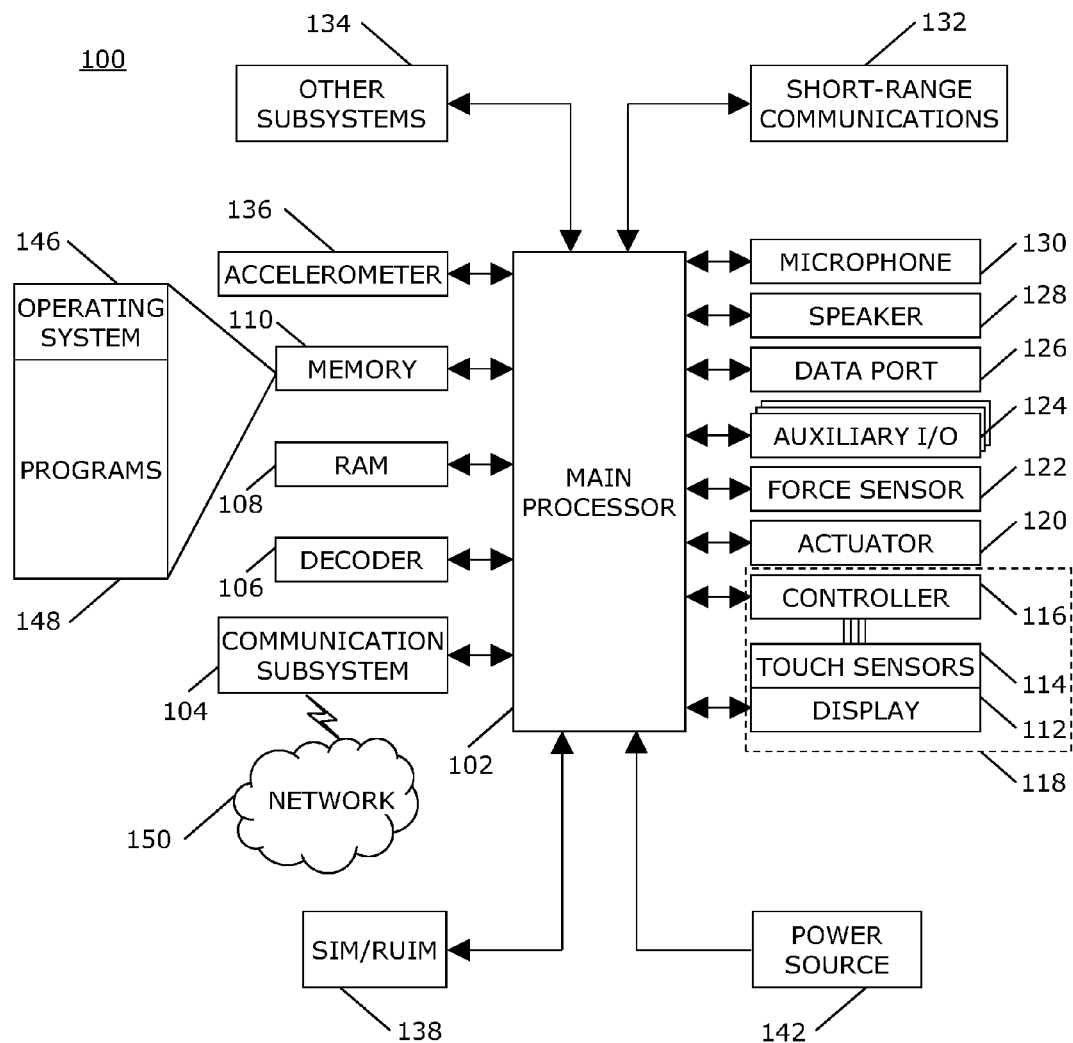
FIG. 1 is a block diagram of a portable electronic device in accordance with the disclosure.

The following describes an apparatus for and method of message search. The apparatus may be an electronic device. The electronic device displays information associated with a message and detects initiation of a search. The initiation is associated with the message such that the electronic device identifies a search request from an element of the message without the search request being received as keyboard input at the time of the search. The search request may be an identity of the sender of the message, a subject of the message, a keyword, and so forth.

The electronic device searches messages to identify messages that correspond to the search request. The electronic device may search all messages available to the electronic device or may search a subset of available messages, such as messages stored at the electronic device, messages stored remotely from the electronic device, and so forth. The electronic device searches multiple message types, such as electronic mail messages, short messaging service (SMS) messages, PIN messages, instant messages, multimedia messaging service (MMS) messages, voicemails, voice-to-text converted voicemails, missed voice calls, and so forth. The electronic device displays the results of the search sorted by message type. The electronic device may first display the message type of the message associated with the search initiation followed by other message types. In another example, messages may additionally or alternatively be sorted by a date associated with the message, such as the receipt date, the sent date, and so forth.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. 'The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Electronic devices provide access to multiple message systems that process messages of different types. For example, messages include electronic mail messages, SMS messages, PIN messages, instant messages, MMS messages, voicemails, missed voice call identifications, notifications, and so forth. Electronic devices also provide access to multiple message accounts on a message system. Messages for the multiple message systems and accounts are often stored separately on the electronic devices and servers associated with the electronic devices. Regardless of how the messages are stored, a user may choose to search for related messages amongst some or all available messaging applications, message stores, message systems, and so forth. Some electronic devices provide an advanced search option, where a search request is received by the electronic device from a physical or virtual keyboard. An advanced search option including a search request input dialog may be displayed as a result of detecting initiation of an advanced search. Some electronic devices display search results of multiple message types sorted chronologically.

The electronic device displays information associated with messages and detect initiation of a search. To facilitate the search, the electronic devices determine a search request, e.g., a search query, a search parameter, a search term, a search attribute, a search aspect, and so forth, from a message for which the associated information is displayed. The search request may be determined from the sender of the message, the subject of the message, the recipient of the message, the body of the message, a keyword in a field of the message, and so forth. For example, a touch associated with a displayed word or phrase of the message results in identification of the word as a keyword to be searched. A search request is determined without the search request being received from a physical or virtual keyboard at the time of the search initiation, without prompting a user to input a search request using a keyboard, without displaying a text box for inputting the search request, without initiation of an advanced search option, and so forth. Some input may be received from the physical or virtual keyboard, e.g., detecting selection of a shortcut key or keys, detecting selection of a selection option from keyboard input, and so forth. Selection options may be referred to as options herein. Optionally, initiation of the search is detected without utilizing an advanced search option.

Figure 2:
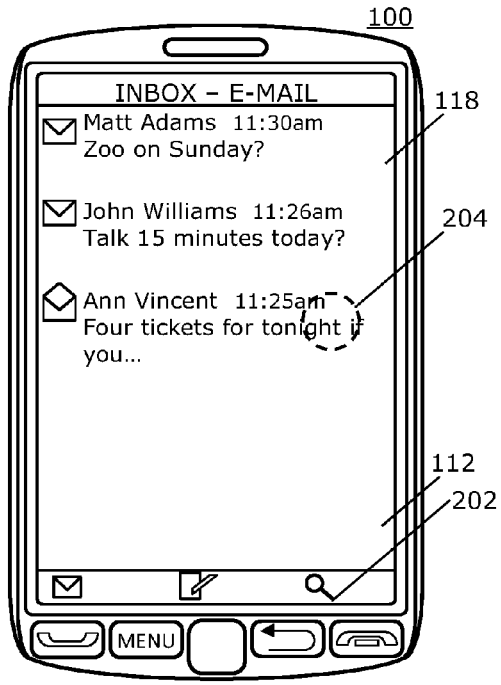
FIG. 2, FIG. 3, FIG. 4, and FIG. 5 illustrate examples of searching messages on an electronic device in accordance with the disclosure.

Information associated with messages is displayed on the touch-sensitive display 118 of the electronic device 100 as shown in the example of FIG. 2. The example messages are electronic mail messages in an inbox of an electronic mailbox. The messages may optionally be any other type of message. A sender, time of receipt, and subject are displayed for each message in this example.

Figure 4:
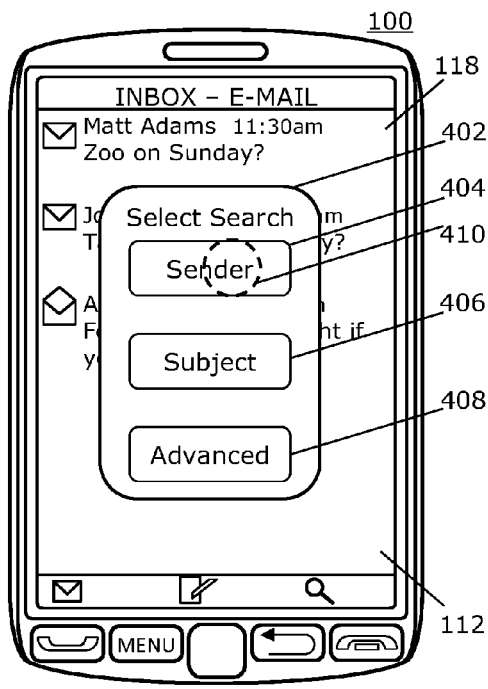
Figure 5:
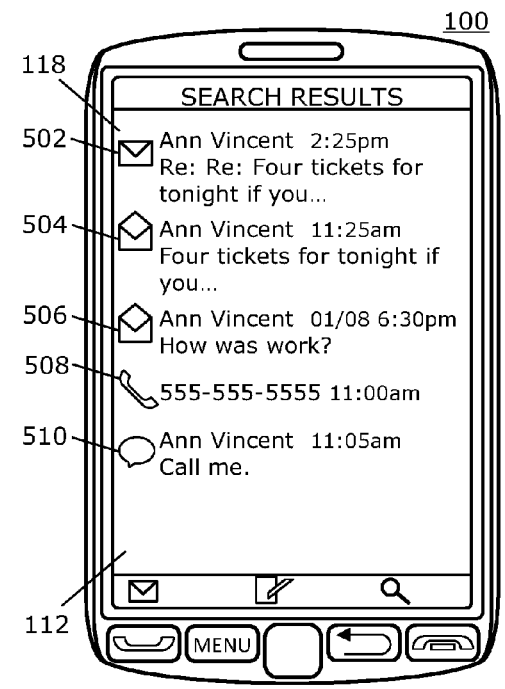

The electronic device 100 includes various physical and virtual controls and selection options, including the search option 202, for detecting interaction with the electronic device 100 including the search option 202. Detecting a touch associated with the search option 202 results in initiation of a search. When message selection is detected, e.g., detection of a touch associated with display of information associated with the message, detecting a touch associated with the search option 202 results in initiation of a search with a search request based on the message. A search menu may be displayed as shown in the example of FIG. 4. Alternatively, the search request may be determined from the message and search results may be displayed as shown in the example of FIG. 5. For example, when a setting of the electronic device is set for searching by sender, the search results as shown in FIG. 5 include messages associated with the sender of the selected message. When selection of a message is not detected, detecting a touch associated with the search option 202 results in displaying a prompt for a search request, e.g., a search request may be input by detecting a touch associated with a message, receiving a search request from a physical keyboard, receiving a search request from a virtual keyboard, and so forth.

Figure 3:
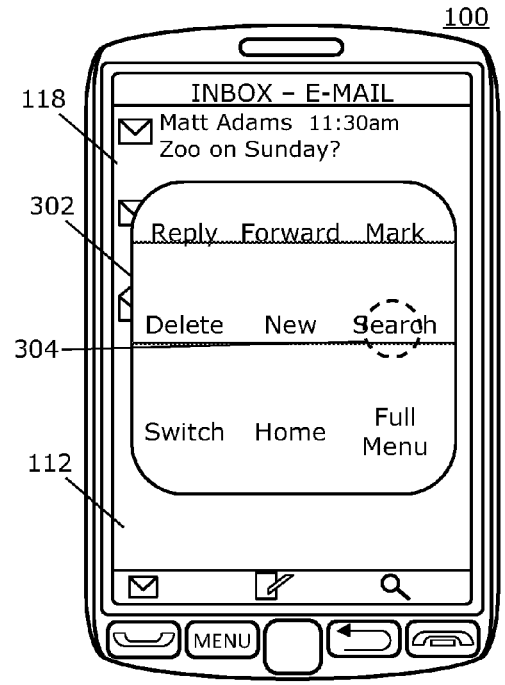

A held touch at a touch location 204 associated with the display of information associated with a message results in display of a menu as shown in the example of FIG. 3. Optionally, the touch location 204 is associated with particular information of the message, such as the sender, the time of receipt, the subject, and so forth. The search request may be determined based on the particular information and the search results may be displayed as shown in the example of FIG. 5. For example, when the touch location 204 is associated with the sender, the search request is determined based on the sender, when the touch location 204 is associated with subject, the search request is determined based on the subject, and so forth. Alternatively, detecting a touch at a touch location 204 associated with a display of information associated with a message results in initiation of a search and a search menu is displayed as shown in the example of FIG. 4.

In the example of FIG. 3, the electronic device 100 displays a menu 304. The example menu 304 includes controls and selection options for detecting interaction with the electronic device 100. Detecting a touch at a touch location 304 associated with a search option of the menu 304 results in initiation of a search. Optionally, detecting the touch at the touch location 304 associated with the search option results in display of a search menu as shown in the example of FIG. 4. Alternatively, where the search request is determined without the menu of FIG. 4, search results are displayed as shown in the example of FIG. 5.

In the example of FIG. 4, the electronic device 100 displays a search menu 402 for indicating how a search request is to be determined. The example menu 402 includes a sender option 404, a subject option 404, and an advanced option 406. Detecting a touch at a touch location 410 associated with the sender option 402 results in determination of a search request based on the sender of the previously selected message, e.g., the message associated with the touch location 204 as shown in the example of FIG. 2.

Detecting a touch associated with the subject option 406 results in determination of a search request based on the subject of the previously selected message. Detecting a touch associated with the advanced option 408 results in display of an advanced search menu.

Search results are displayed on the touch-sensitive display 118 of the electronic device 100 as shown in the example of FIG. 5. The search results of FIG. 5 include messages associated with the sender of the message selected in FIG. 2, "Ann Vincent." The example search results include three emails 502, 504, 506 from Ann Vincent, a missed phone call 508 from a phone number associated with Ann Vincent, and a SMS from Ann Vincent. The search results are sorted by message type. The message type of the message associated with the initiation of the search is listed first, e.g., emails, followed by missed calls, and following by SMS messages. The search results may optionally be sorted by message type first and date second. Alternatively, the search results may not be sorted or may be sorted in any other manner.

Figure 6:
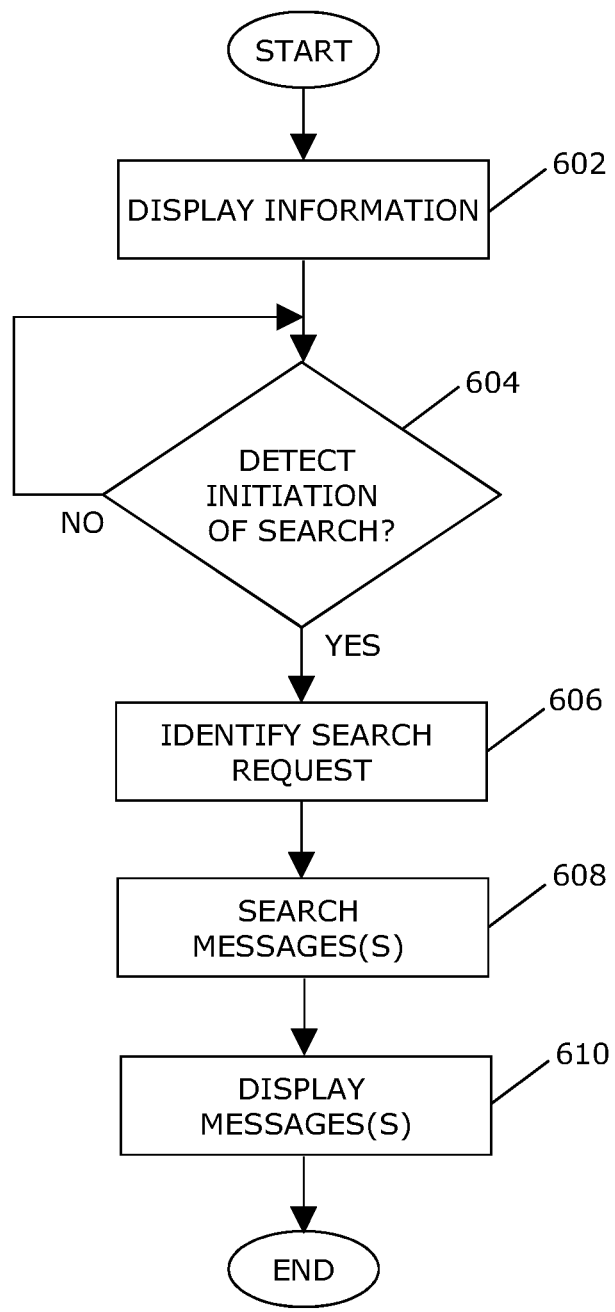
FIG. 6 is a flowchart illustrating a method of message searching on an electronic device in accordance with the disclosure.

A flowchart illustrating a method of message search is shown in FIG. 6. The method may be carried out by software executed, for example, by the processor 102. Optionally, some or all of the method may be carried out by software executed on a processor remote from the electronic device 100, such as a processor of a server, a processor of a message service, a processor of a network cloud service, and so forth. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Information associated with messages is displayed 602 on the touch-sensitive display 118. The messages may be any type of messages. Any information associated with the messages may be displayed, such as a sender of a message, a recipient of a message, a time of receipt of a message, a subject of a message, a body of a message, and so forth. The information displayed for the messages may vary based on the message type. Information associated with a single message maybe displayed or information associated with multiple messages may be displayed.

When initiation of a search associated with a message is detected 604, the electronic device 100 identifies 606 a search request determined from at least part of an element of the message. The search may be initiated by detecting selection of a search option, such as the search option 202 or the search option of the menu 304; by detecting a held touch, such as the touch detected at the touch location 204; and so forth. An element of a message may include a date included in the message, a proper noun included in the subject of the message, a proper noun included in the body of the message, a location included in the subject of the message, a location included in the body of the message, a unique or semi-unique number included in the subject of the message, a unique or semi-unique number included in the body of the message, a unique or semi-unique number included in the sender of the message, a unique or semi-unique number included in the recipient of the message, a keyword in the subject of the message and specified in a listing of keywords, a keyword in the body of the message and specified in the listing of keywords, one or more special characters, and so forth.

The search request may be determined from the sender of the message, the subject of the message, or any other element of the message. Optionally, the search request is determined based on detecting selection of a selection option, such as the options 404, 406, 408 of the search menu 402. Alternatively, the search request is determined based on detecting a touch at a location associated with initiation of the search. For example, detecting a touch at a location associated with display of sender information of a message results in determining a search request from the sender information. Optionally, the search request is determined based on a setting of the electronic device 100. For example, when the setting is set to "Subject," the search request is determined from subject of the message. The search request may be determined from a single element of a message or may be determined from multiple elements of a message. For example, the search request may be determined from a sender of a message and a subject of the message.

The search request may be determined to be all or part of an element of a message. For example, if the sender of a message is John User <juser@domain.com>, the search request may be juser@domain.com, juser, John, User, John User, domain, domain.com, and so forth. For example, if the subject of a message is Meet me at 10 pm at the Diner, the search request may be 10 pm, 9 pm to 11 pm, Diner, Meet, Meet me, and so forth.

After identifying 606 the search request, the electronic device 100 searches 608 for messages that correspond to the search request. For example, messages that correspond to the search request have at least one element that corresponds to at least one element of the search request. An element of a message corresponds to an element of a search request when the elements match, when a part of the elements match, when the elements are similar, and so forth. Optionally, an element of a message may correspond to an element of a search request when the elements are linked in an information list, such as contact information stored in an address book, contact list, contact application, and so forth. For example, a record in an address book identify a persona and may include, for that person, a first identifier, e.g., a telephone number, associated with a first message type and a second identifier, e.g., an electronic mail address, associated with a second message type. In such an example, when searching by sender based on a message from the first identifier, the electronic device 100 may identify messages having a sender specified by the first identifier or the second identifier.

Optionally, the electronic device 100 may search 608 for messages by transmitting the search request or information associated with the search request to one or more remote devices. The electronic device 100 may transmit the search request to one or more messaging servers. The electronic device 100 may receive the search results from the one or more remote devices.

The electronic device 100 searches among messages having multiple message types. Optionally, the electronic device 100 may search among messages stored in multiple locations at the electronic device 100, messages stored in multiple folders, or messages stored remotely from the electronic device 100. Optionally, the electronic device 100 may include a setting for identifying which of the available message types are to be searched, a selection option for identifying message types may be displayed in response to the search request or the initiation of the search, and so forth.

The messages identified by searching 608 are displayed 610 on the touch-sensitive display 118. Optionally, the display of the messages is sorted by message type. Messages of the same type as the message for which the search was initiated are displayed first followed by messages of other types. For example, when the search was initiated based on an electronic mail message, electronic mail messages are sorted first followed by other message types as shown in, for example, FIG. 5. Alternatively, the messages may be sorted, re-sorted, rearranged, and so forth. The messages may be sorted by one or more of type, date, subject, sender, and so forth.

Initiating a search and determining a search request based on an existing message, as disclosed herein, facilitates searching of messages without receiving the search request by keyboard input, making searching of messages easier. Searching without receiving the search request by keyboard input is advantageous, for example, on a mobile device due to reduced user input capabilities. Additionally, searching multiple message types without an advanced search facilitates efficient access to related messages. For example, multiple message types can be searched from a display of a message without switching to a dedicated search interface. Searching multiple message types facilitates identifying related messages that are received from multiple message services. In an example scenario, an electronic mail message from a sender proposes a time for a meeting, a discussion topic for the meeting is sent by the sender in an SMS message, and a change to the meeting time is left in a voicemail from the sender. Initiating a search with the search request based on the sender of the electronic mail message locates the three messages and displays them, optionally, sorting by message type with the electronic mail message displayed first. As disclosed herein, selecting controls or selection options to reach an Advanced Search or search request entry dialogue is not needed.

A method comprises displaying information associated with a first message of a first type on a display of an electronic device and detecting initiation of a search associated with the first message. The method includes identifying, by the electronic device, a search request determined from an element of the first message and searching, by the electronic device, for a second message of the first type and a third message of a second type, wherein the second message and the third message correspond to the search request. The method includes displaying information associated with the second message and information associated with the third message.

A method comprises displaying information associated with a first message of a first type on a display of an electronic device, detecting a search request associated with the first message, and identifying, by the electronic device, a search request determined from an element of the first message. The method includes searching, by the electronic device, for messages that correspond to the search request and displaying results of the searching by type, wherein messages having the first type are displayed first followed by messages of a second type.

An electronic device comprises a display and a processor configured to display information associated with a first message of a first type on the display, detect initiation of a search associated with the first message, identify a search request from an element of the first message, search for a second message of the first type and a third message of a second type, wherein the second message and the third message correspond to the search request, and display information associated with the second message and information associated with the third message on the display.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying information associated with a first message of a first type on a display of an electronic device;
   detecting initiation of a search associated with the first message;
   receiving a selection of at least one of a plurality of displayed search menu selection options while simultaneously displaying the first message, the plurality of displayed search menu selection options including a sender of the first message option and a subject of the first message option, the displayed first message including at least one of a sender of the first message, a first address that is a source address of the first message, a subject of the first message, a word in a body of the first message, or a combination thereof;
   forming a search request from data of the first message corresponding to the selection option and a second address that is a source address for a second type of message received by the sender, the first type being different than the second type;
   searching, by the electronic device, for a second message of the first type and a third message of the second type, wherein the second message and the third message correspond to the search request; and
   displaying information associated with the second message and information associated with the third message.

2. The method according to claim 1, wherein the search request is determined without the search request being received as keyboard input.

3. The method according to claim 1, further comprising sorting results of the search request based on message type to cause messages of the first type to be displayed first.

4. The method according to claim 1, comprising sorting display of the second message and the third message by message type.

5. The method according to claim 4, comprising secondarily sorting display of the second message and the third message by a date.

6. The method according to claim 1, wherein the detecting is in response to the search request.

7. The method according to claim 1, wherein the search request is an identity of the sender and the identity includes a first identifier associated with the first type and a second identifier associated with the second type.

8. The method according to claim 1, wherein the search request is at least a part of a subject of the first message.

9. The method according to claim 8, wherein the at least a part of the subject includes a keyword.

10. The method according to claim 1, wherein detecting the initiation of the search request comprises detecting a touch associated with display of the first message.

11. The method according to claim 1, wherein the searching comprises searching one of a memory of the electronic device or a remote memory.

12. The method according to claim 1, wherein the search request is formed without text input provided after the initiation of the search.

13. The method according to claim 1, wherein the searching searches multiple message accounts.

14. The method according to claim 1, wherein the type of a message is based on a protocol of the message.

15. The method according to claim 1, wherein the first type is one of an electronic mail message, a short messaging service message, a PIN message, an instant message, a multimedia messaging service message, a voicemail, or a missed voice call.

16. The method according to claim 1, wherein searching includes transmitting the search request to a remote device and receiving results of the searching from the remote device.

17. The method according to claim 1, wherein the first address is a telephone number and the second address is an electronic mail address.

18. A non-transitory computer-readable medium having computer-readable code executable by at least one processor of an electronic device to:
   display information associated with a first message of a first type on a display of an electronic device;
   detect initiation of a search associated with the first message;
   receive a selection of at least one of a plurality of displayed menu selection options, while simultaneously displaying the first message, the plurality of displayed search menu selection options including a sender of the first message option and a subject of the first message option, the displayed first message including at least one of a sender of the first message, a first address that is a source address of the first message, a subject of the first message, a word in a body of the first message, or a combination thereof;

form a search request from data of the first message corresponding to the selection option and a second address that is a source address for a second type of message received by the sender, the first type being different than the second type;

determine a search request comprising the first address and the second address; search, by the electronic device, for a second message of the first type and a third message of the second type, wherein the second message and the third message correspond to the search request; and display information associated with the second message and information associated with the third message.

19. An electronic device comprising:
a display;
a processor configured to:
display information associated with a first message of a first type on the display;
detect initiation of a search associated with the first message;
receive a selection of at least one of a plurality of displayed search menu selection options, while simultaneously displaying the first message, the plurality of displayed search menu selection options including a sender of the first message option and a subject of the first message option, the displayed first message, including at least one of a sender of the first message, a first address that is a source address of the first message, a subject of the first message, a word in a body of the first message, or a combination thereof;
form a search request from data of the first message corresponding to the selection option and a second address that is a source address for a second type of message received by the sender, the first type being different than the second type;
search for a second message of the first type and a third message of the second type, wherein the second message and the third message correspond to the search request; and
display information associated with the second message and information associated with the third message on the display.

20. The electronic device according to claim 19, wherein the search request is determined without the search request being received as keyboard input.

21. The electronic device according to claim 19, comprising a memory storing the first message, the second message, and the third message.

22. The electronic device according to claim 19, further comprising sorting results of the search request based on message type to cause messages of the first type to be displayed first.

23. The electronic device according to claim 19, comprising sorting display of the second message and the third message by message type.

24. The electronic device according to claim 23, comprising secondarily sorting display of the second message and the third message by a date.

25. The electronic device according to claim 19, wherein the detecting is in response to the search request.

26. The electronic device according to claim 19, wherein the detecting is in response to the search request.

* * * * *